United States Patent [19]

Meister et al.

[11] Patent Number: 4,463,706
[45] Date of Patent: Aug. 7, 1984

[54] METHOD AND SYSTEM FOR MONITORING THE DISPENSING OF DRUGS OR NUTRIENTS TO ANIMALS

[75] Inventors: Jack B. Meister, Convent Station; David W. Van Winkle, Flanders, both of N.J.

[73] Assignee: J.B.M. Associates, Convent Station, N.J.

[21] Appl. No.: 379,752

[22] Filed: May 19, 1982

[51] Int. Cl.³ .............................................. A01K 7/02
[52] U.S. Cl. .................................... 119/51 R; 119/72
[58] Field of Search ............... 119/51 R, 72; 194/9 R, 194/4 C; 221/15

[56] References Cited

U.S. PATENT DOCUMENTS

| | | | |
|---|---|---|---|
| 3,465,724 | 9/1969 | Broadbent | 119/51 R |
| 3,516,575 | 6/1970 | Moffitt | 119/51 R X |
| 3,541,995 | 11/1970 | Fathauer | 119/51 R |
| 3,557,758 | 1/1971 | Lack | 119/51 R |
| 4,129,855 | 12/1978 | Rodrian | 119/51 R |
| 4,297,974 | 11/1981 | Poiesz | 119/51 R |

*Primary Examiner*—Hugh R. Chamblee
*Attorney, Agent, or Firm*—Ronald G. Goebel; H. Hume Mathews; Martha G. Pugh

[57] ABSTRACT

The disclosed system comprises one or more stationary dispensers associated with drinking fountains for farm animals, for dispensing predetermined doses of drugs or nutrients, operating in cooperation with a plurality of portable units constructed for individual animals. The portable units are designed to interact electronically with a stationary dispenser to control the amount and timing of the doses. The stationary dispenser includes in circuit relation, an interrogator-transmitter, a reply receiver, and a liquid dispenser responsive to the reply receiver. Each portable system comprises a coded passive transponder, a timer, and a memory element. When an animal comes within range of the stationary dispenser, its portable transponder is interrogated. A coded reply is sent by the animal's transponder indicating whether animal has received a dose within a preceeding preselected time interval. If a positive reply is received by the stationary dispenser circuit, no further action is taken. The animal may drink but no dose of medication or nutrient will be dispensed. If a negative reply is received, then the dispenser valve is enabled, releasing the desired pre-measured dose if the animal drinks. Operation of the dispenser valve also causes a coded signal to be transmitted from the interrogator-transmitter to the animal's portable unit setting a memory element, indicating that the animal has received the required dose, and initiating the running of the preselected time period, after elapse of which, the memory element is reset for enabling the next dosage.

23 Claims, 12 Drawing Figures

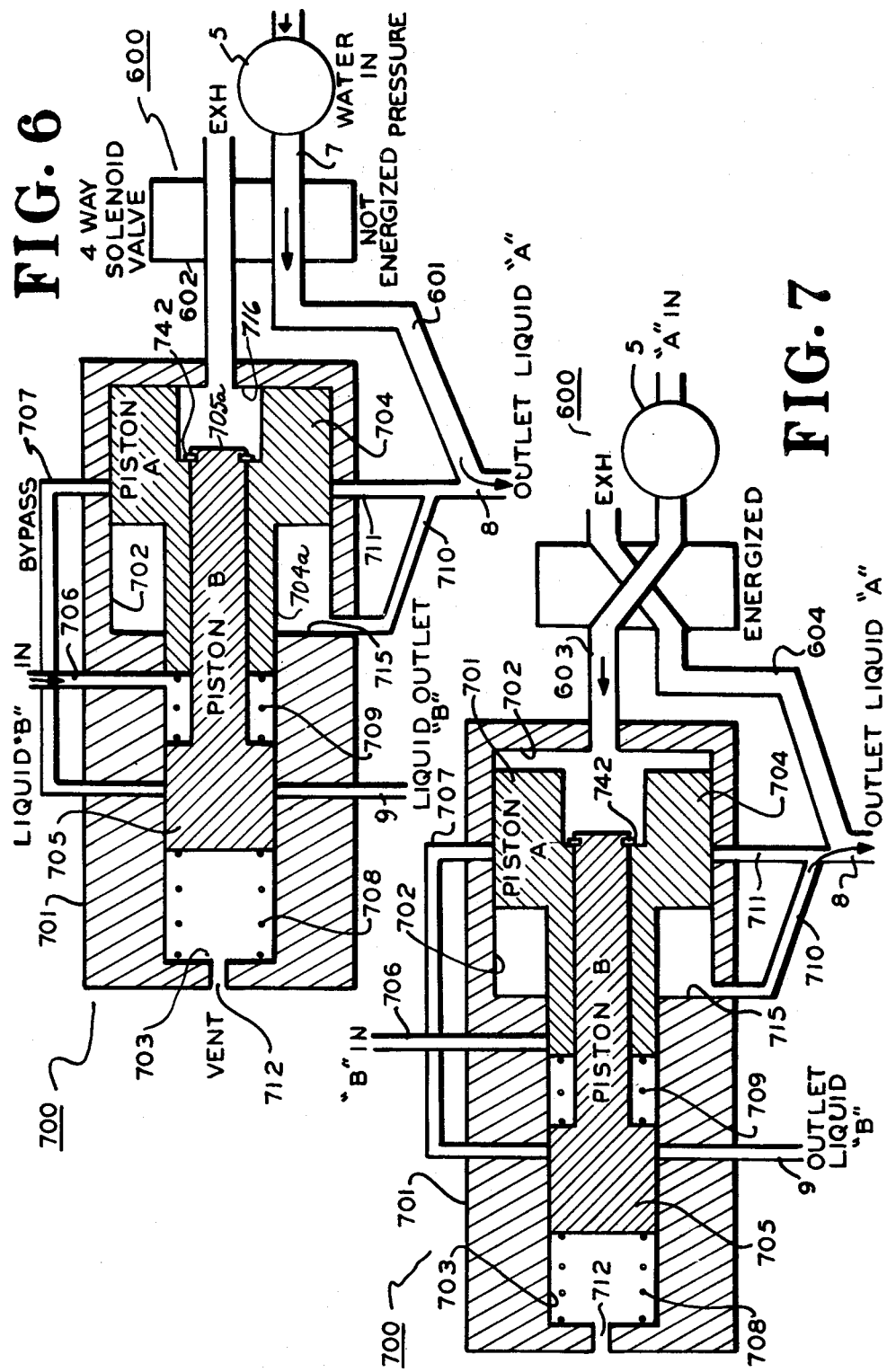

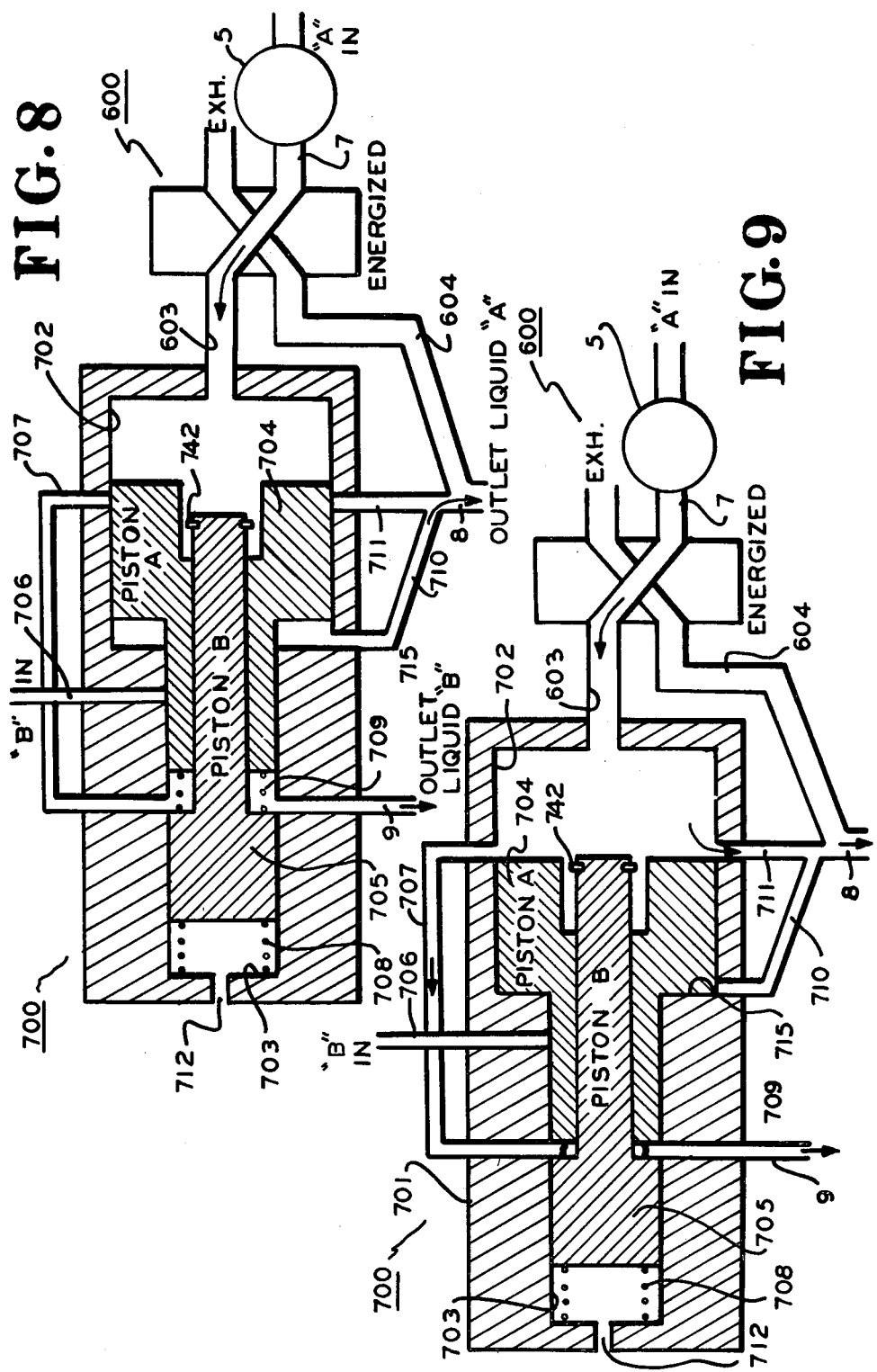

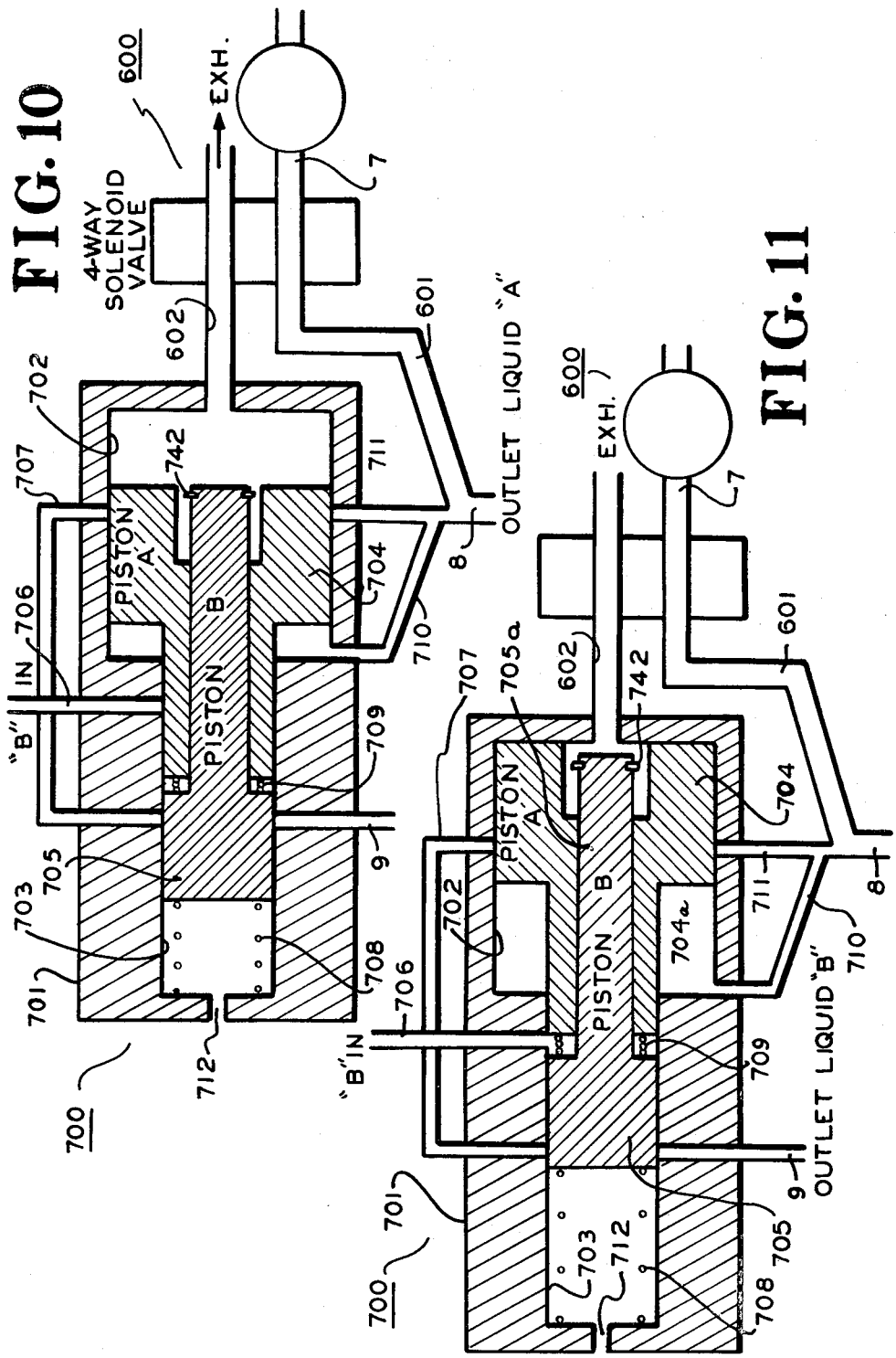

METHOD AND SYSTEM FOR MONITORING THE DISPENSING OF DRUGS OR NUTRIENTS TO ANIMALS

BACKGROUND OF THE INVENTION

On commercial-scale farms, it is often necessary to dispense doses of medication or nutrients, such as vitamins, to all of the animals in a large herd. To service the animals individually is time consuming and uneconomical. One way of simplifying this procedure has been to add doses of medicine or vitamins to the animal's drinking water. But this raises a new problem, in that some animals would get more than the desired dosage, which might not only be wasteful but actually harmful, whereas other animals would receive too small a dose or none at all. Thus, the problem is one of determining at the dispensing station which of the animal's have received their necessary dosage, and withholding doses from them for a preselected period.

BRIEF DESCRIPTION OF THE INVENTION

Accordingly, the principal object of this invention is to improve the dispensing of medication or nutrients to farm-type animals, more particularly, by providing a method and system for controlling the amount and timing of the doses which they receive.

Another object is to provide a system or method for controlling the dispensing of medication and/or nutrients to animals from one or more central stations in cooperation with a portable unit which is simple, and easy to maintain, requires a minimum amount of power to operate, and is light weight and minimally irritating for the animals to wear.

Another, more general object, is to provide a method and system for servicing each of a plurality of portable units at preselected time intervals, individually adjustable, from one or more stationary units.

These and other objects are achieved in a system comprising one or more stationary dispensing stations and a plurality of portable units, one of which is attached to each of the animals it is desired to service.

In the system described, the stationary dispensing station, which is constructed to dispense water on demand when mechanically triggered by the animal, has connected thereto a stationary control circuit for controlling the dispensing, with the water, of doses of medicine and/or nutrients. The stationary control circuit induces an interrogating oscillating signal in a tuned circuit transponder in the portable unit attached to the animal's collar, which is absorbed or not absorbed in accordance with the code setting in a memory circuit, to give a positive or negative response in the stationary control circuit. If the response is "negative", indicating that the animal has not received its dose, relays are actuated in the stationary control circuit energizing a solenoid to operate a water-powered dispenser to release a measured amount of medicine or nutrient into the drinking fountain when a paddle valve is nudged by the animal. Simultaneously, a recording signal is transmitted from the stationary control circuit to the animal's portable unit, resetting the memory circuit and initiating operation of a timing circuit in the portable unit for a preselected period, say, 24 hours.

If the animal again approaches the drinking fountain within the preselected period, the memory circuit operates to detune the animal's unit so that none of the energy of the interrogating signal is absorbed, causing the energy of the interrogating oscillator to remain intact, producing a "positive" response at the stationary control circuit, whereby the relay means is disabled. Thus, when the animal nuzzles the paddle valve, only water is released, and the metering pump for medication and/or nutrients remains disabled.

After the timer in the portable circuit has run its course, the memory circuit is reset, again tuning a circuit in the animal's collar to the frequency of the interrogating signal. Thus, if the animal again approaches the drinking fountain, the interrogating signal is partially or totally absorbed, according the present memory code, again triggering the stationary circuit, so that the solenoid is energized, the metering pump is actuated, and the animal receives another dose.

It is also contemplated that sensors may be included in the control circuit to sample the fluid fed into the metering pump, and to disable the metering pump if the quality or content of the medication or other fluid does not meet a preselected standard.

It will be apparent that the disclosed system provides a simple and effective way of controlling the medication or nutrients supplied to a large herd of animals, enabling each animal to be individually monitored without the necessity for a large power source for the animal's unit.

Furthermore, the system of the present invention has a particular advantage in that the medication records for each animal are stored in circuitry on the animal; therefor, there is no necessity for keeping records at the dispensing station, or of communication between dispensing stations. Hence, the system is infinitely expandable to accommodate a herd of any size, in that the number of dispensing stations or satellite stations may be increased without any circuit changes in or interconnection between the dispensing stations.

A particular feature of the present invention is that it functions on the basis of inductive coupling between an oscillator circuit in a stationary control circuit and tuned circuits individually controlled by a memory circuit in each of a plurality of portable circuits. The memory circuits are individually set by a recording signal from the control circuit.

These and other objects, features, and advantages of the invention will be apparent from a study of the specification hereinafter with reference to the attached drawings.

SHORT DESCRIPTION OF THE DRAWINGS

FIGS. 6, 7, 8, 9, 10 and 11 are showings, in schematic longitudinal section, of the metering dispenser pump of the present invention, in cooperating relation with a four-way solenoid valve.

DETAILED DESCRIPTION OF THE DRAWINGS

Figure 1:
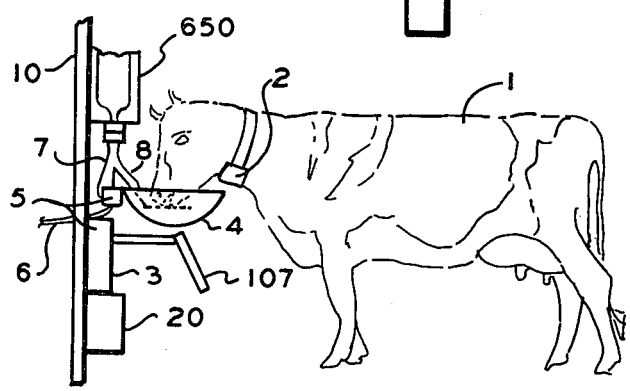
FIG. 1 is an overall schematic showing of the physical layout of the monitoring system of the present invention, in which a stationary control station is approached by an animal wearing a portable circuit on its collar.

Referring to FIG. 1 of the drawings, a cow is shown drinking from a fountain 4 which is mounted on a pole 10, which may be one of a number of drinking troughs or fountains dispersed in a field in which a herd is grazing. Flow of water, (which for reference will be called "Liquid A"), into the fountain 4 is actuated when the cow nuzzles the paddle 5a of a paddle valve 5 which controls the input from pipe 6 which is connected to a conventional water source not shown.

Figure 2A:
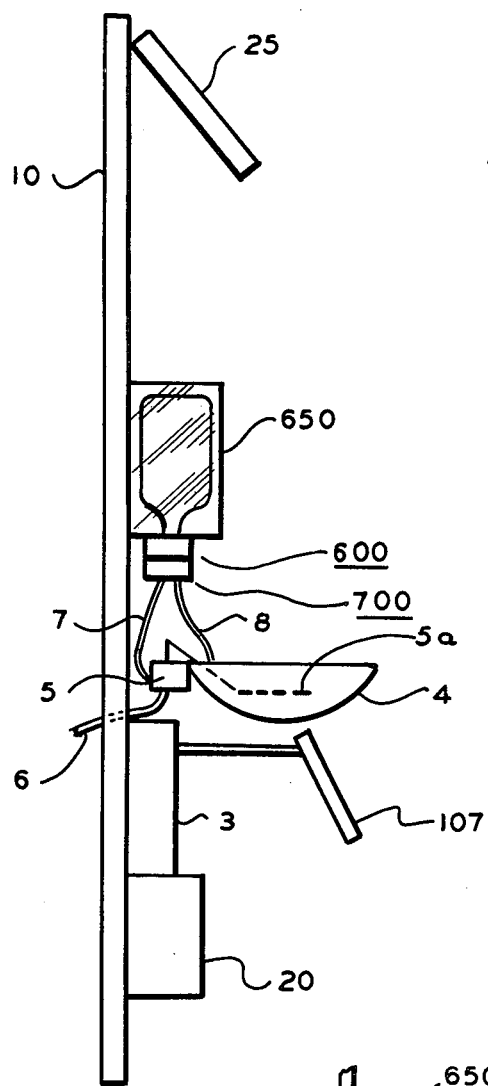
FIGS. 2A and 2B are schematic showings of the physical structures present at the control station including the animal medication dispenser and drinking fountain, in accordance with the present invention.
Figure 2B:
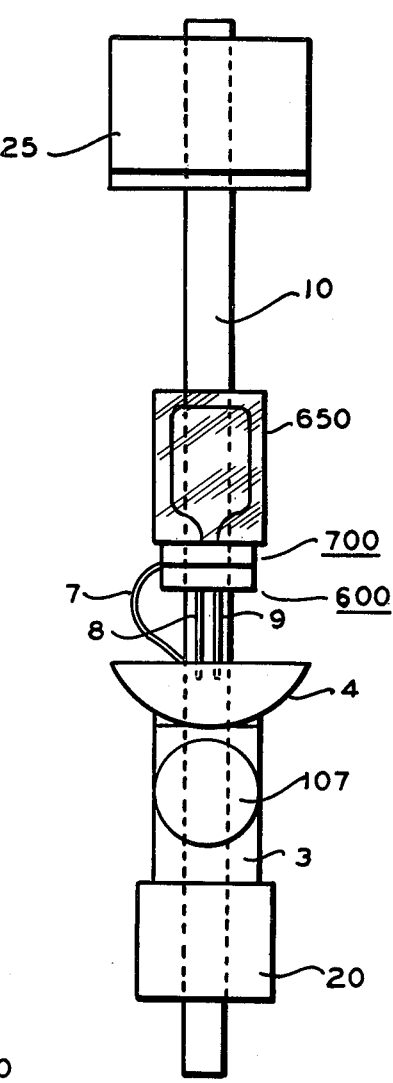

In accordance with the present invention, as shown in FIGS. 2A, 2B, the drinking fountain 4 is associated with a dispensing station for dispensing medicine or nutrients (hereinafter called "Liquid B") into the drinking fountain to be ingested by the animal as it drinks, but only in accordance with a preselected program in which only a measured amount of Liquid B is to be dispensed to each animal during a set period, say, 24 hours.

Figure 3:
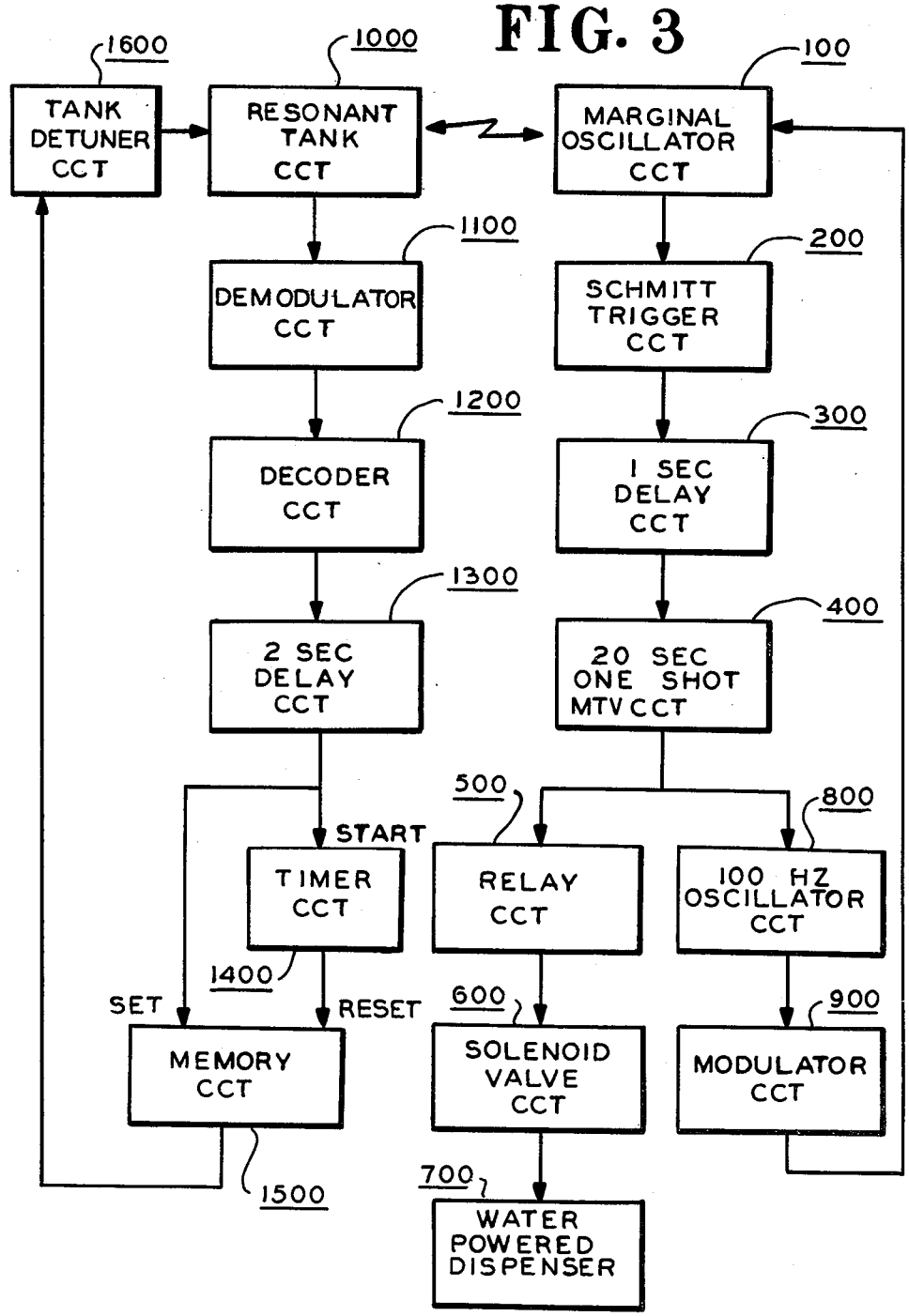
FIG. 3 shows, in cooperative relation, the block diagrams for the stationary control circuit and the portable animal circuit in a preferred circuit arrangement for the monitoring system of the present invention.
Figure 5:
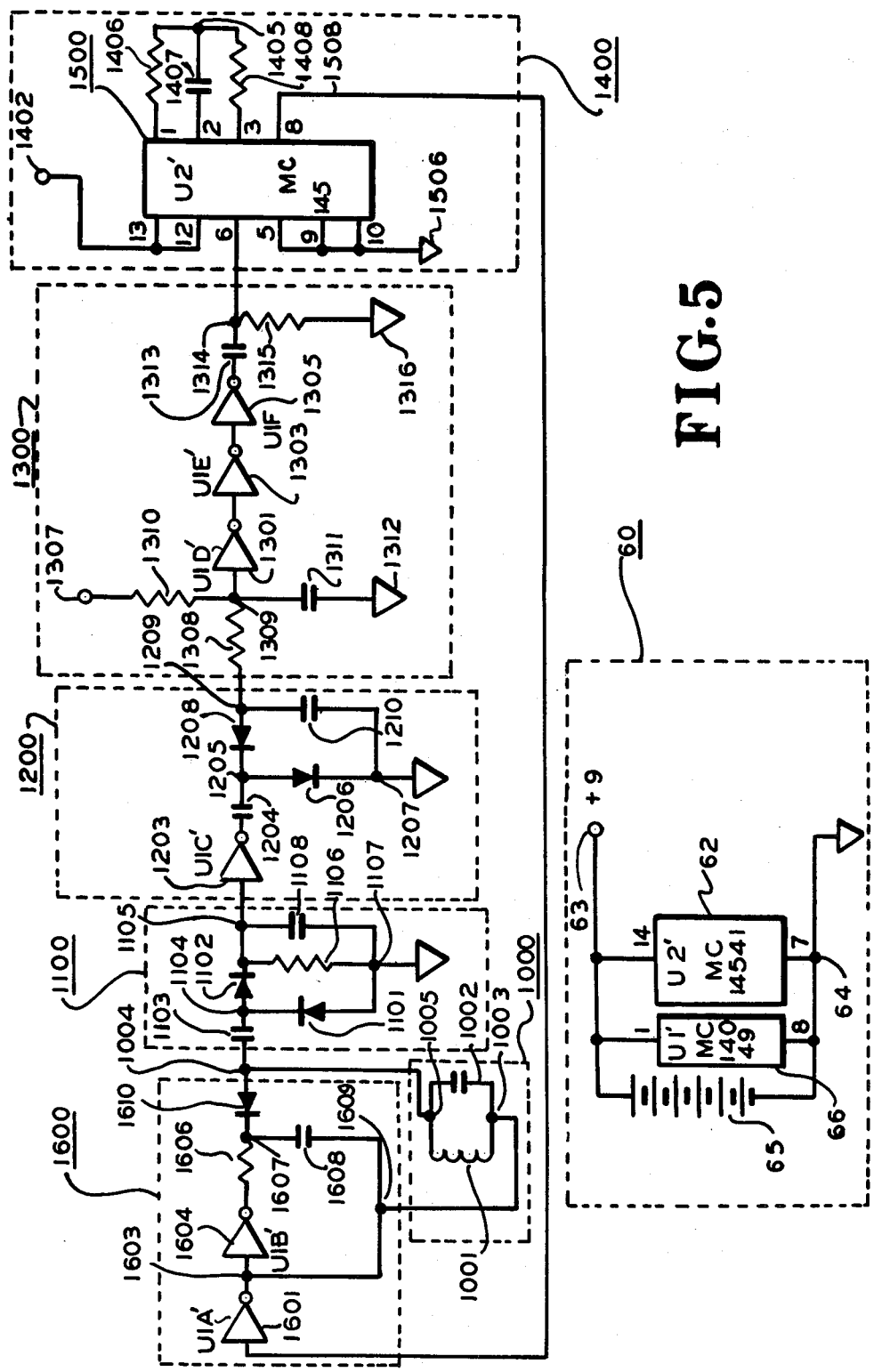
FIG. 5 is a detailed circuit schematic of the portable animal circuit for the monitoring system of the present invention.

Each animal's intake of Liquid B is under control of an individual portable electronic circuit 2 which may be strapped around the animal's neck by means of a collar, or otherwise secured to the animal. The portable electronic circuit 2, which will be described in detail hereinafter with reference to FIGS. 3 and 5, is designed to cooperate in inductive energy transfer relation with a control circuit 3 which is mounted on the pole 10 beneath, or otherwise adjacent to the drinking fountain 4. The control circuit 3, which is powered by a battery 20 or other conventional source of power, and including an inductance coil 107, oscillates, in standby condition, producing an unmodulated interrogating carrier-wave signal, of a frequency of 200 kilohertz, in the described example, whose energy may be absorbed or not absorbed, in response to the close proximity of the portable circuit 2, as described hereinafter. A solar panel 25, of any of the types well-known in the art, is mounted to the pole 10, and is connected in circuit relation to the battery 20 and control circuit 3 to operate as an auxilliary or substitute power source.

Referring to the block diagram shown in FIG. 3, if the cow has not received a dose of Liquid B within the preceding preset period, as the cow 1 approaches fountain 4, then the portable circuit 2 partly absorbs the 200 kilohertz interrogating carrier-wave from oscillator 100 of stationary control circuit 3 in the control circuit 3, providing a first coded signal which actuates relay means. This energizes a 4-way solenoid valve 600 in the control circuit 3 in cooperation with a water-powered dispensing device 700, which, when the paddle valve 5 is actuated, releases a premeasured dose of Liquid B from the storage tank 650 into the drinking water in fountain 4. The water (Liquid A) passes into solenoid valve 600 through the intake conduit 7; and the mixture of Liquids A and B is dispensed into the fountain 4, through the outlet conduit 8.

Simultaneously with the operation of 4-way solenoid valve 600 and dispenser 700, the carrier-wave oscillations induced in portable circuit 2 by carrier-wave oscillator 100 are modulated with a recoding signal through the 100 hertz oscillator 800 and modulator circuit 900. The recoding signal being absorbed and demodulated in portable circuit 2, resets a memory circuit 1500 therein under control of a timing circuit 1400 (for a preset period, say, 24 hours) during which time the portable circuit 2 is detuned so that it does not absorb the carrier-wave oscillations from the control circuit 3 when the portable circuit 2 comes in close proximity therewith. Thus, if cow 1 returns to the water fountain 4 (or any other fountain in the system) within the preset period after it has received a dose of Liquid B, and actuates the paddle-valve 5, it will receive only a drink of water, since the interrogating carrier-wave signal induced by the control circuit 3 in portable circuit 2 during the timing period is not absorbed, leaving the energy of carrier-wave oscillator 100 intact, so that the control circuit 3 does not respond during the period to the presence of the portable circuit 2. All of these operations will be described in detail with reference to FIGS. 3-11 hereinafter. After the timer 1400 in the portable circuit 2 has run its course, memory circuit 1500 is reset; and if the cow 1 again approaches the drinking fountain 4, the interrogating carrier-wave signal from the control circuit 3 is again partly absorbed, according to code setting in the portable circuit 2, again enabling the control circuit 3 which again actuates the dispensing means for Liquid B, enabling the animal to receive another dose.

Figure 4:
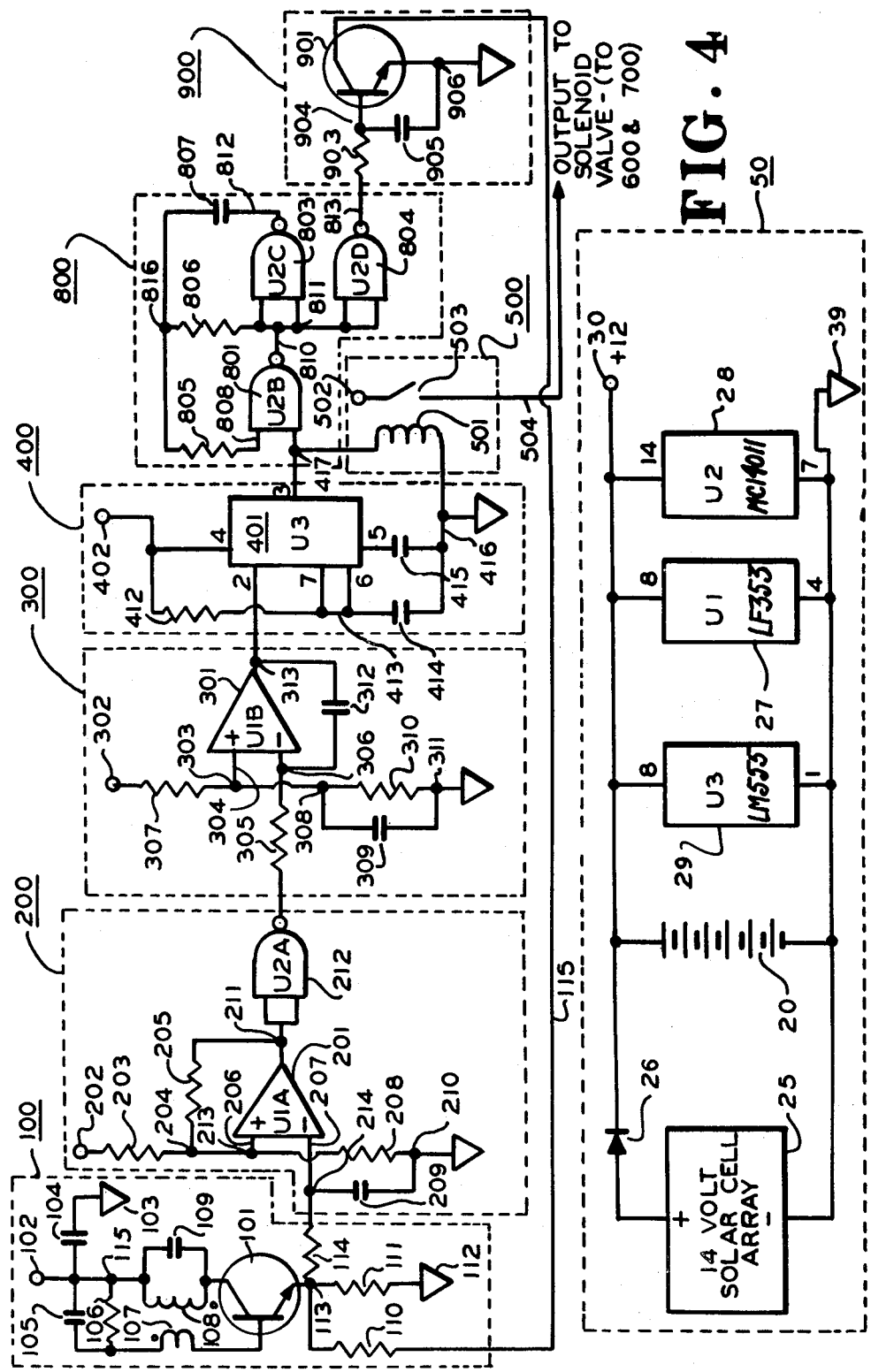
FIG. 4 is a detailed circuit schematic of the stationary control circuit of the monitoring system of the present invention.

Let us now refer in detail to FIG. 4, which is the detailed circuit schematic for the present illustrative embodiment of the stationary control circuit shown in block diagram in FIG. 3.

For convenience of description, the power circuit 50 is shown as a separate block including conventional 12 volt, direct current battery 20 in parallel with a 14 volt solar cell array 25, which is connected through the rectifier 26 to the junction with 20. Solar cell array 25 is preferably of a type sold by Solarex Corporation, 1335 Piccord Drive, Rockville, Md. 20850, under the trademark UNIPANEL solar panel, and disclosed on page 11 of their Catalogue #6101-4, published Aug. 19, 1981. This is connected to charge up battery 20. Connected in parallel across the power terminal 30 and ground terminal 39 are three integrated circuit chips 29, 27 and 28.

In the signal circuits of blocks 100 through 800, the terminals 102, 202, 302, 402 and 502 correspond to positive power terminal 30; and the ground terminals 112, 210, 311, 416 and 906 correspond to ground terminal 39.

For convenience, the individual components of the integrated circuits U1, U2 and U3 are shown separately as parts of signal circuits 200 through 800. For example, parts of integrated circuit U1 are identified as 201 (U1A) in Schmitt Trigger circuit 200, and 301 (U1B) in the one-second delay circuit 300. In preferred form in the present illustrative embodiment, integrated circuit chip 27, identified as U1, is connected across the power terminals 30 and 39 through its pins 4 and 8, and may be, for example, an operational amplifier circuit manufactured by National Semiconductor Corporation of 2900 Semiconductor Drive, Santa Clara, Calif. 95051, and identified in Section 3 of the Linear Datebook published by that corporation, as an LF353 Wide Bandwidth Dual JFET Input Operational Amplifier. These amplifiers require low supply current, but maintain a large gain bandwidth product and fast slew rate.

Integrated circuit chip 28, identified as U2, comprises NAND gate 12 (U2A) in Schmitt Trigger 200, and NAND gates 801, 803 and 804 (U2B), (U2C), and (U2D) in oscillator circuit 800. In preferred form, integrated circuit chip U2 which is connected by its pins 7 and 14 across power terminals 30 and 39, is manufactured by Motorola Semiconductor Products, Inc., 3501 Ed Bluestein Boulevard, Austin, Tex. 78721, under the Catalogue #MC14011B, and comprises a quad 2-input NAND gate, constructed with p and n channel enhancement in a single monolithic structure. It is characterized by low power dissipation and high noise immunity.

Integrated circuit chip U3, identified as 401 in the 20-second one-short multivibrator circuit 400, is connected by means of its pins 1 and 8 across the terminals 30 and 39 of the 12-volt power circuit 50. Integrated circuit chip U3 may preferably be in the form of a timer circuit manufactured by the National Semiconductor Corporation of Santa Clara, Calif., under the Catalogue #LM555, as disclosed in Section 9 of the Linear Databook published by that corporation. This is a highly stable device for generating accurate time delays or oscillation. For a stable operation, the free running-frequency and duty cycle are accurately controlled by the external resistor and capacitors described hereinafter.

The 200 kilohertz oscillator 100 comprises the following elements in circuit connection. The transistor 101, which, for example, may be a n-p-n silicon type, manufactured by Motorola Semiconductor Products, Inc., such as designated in Motorola Catalogue #MPS6560, has its collector connected to the positive power terminal 102 in series through a tuned circuit comprising the mutual inductance coil 108 in parallel with the silver mica 100 picofarad capacitor 109. In the present embodiment, inductance coil 108 comprises 43 turns of 30 gauge enamel copper wire known as "magnet wire". This is in mutual inductive relation with coil 107, which, in the present embodiment comprises 5 turns of 30 gauge enamel copper wire of the type indicated above. Coils 107 and 108 are each wound on the same eleven-by-thirteen inch form.

The positive power terminal 102 is connected to ground through the 0.02 microfarad, 50 volt ceramic-disc capacitor 104. Power terminal 102 is also connected through the 0.005 microfarad, ceramic-disc capacitor 105 in parallel with the one megohm, ¼ watt resistor 106 to one terminal of coil 107, whose other terminal is connected to the base of transistor 101. The emitter of transistor 101 is connected through junction 113 to ground 112, through the ¼ watt, 4.7 kohm resistor 111. A signal circuit from the output of modulator circuit 900, which will be described hereinafter, is connected to the junction 113 at the emitter of transistor 101 through the ¼ watt, 100 ohm resistor 110. The output across resistor 111 is connected from junction 113 to junction 214 at the negative input terminal of the amplifier 201 (U1A) through the ¼ watt, 10 megohm resistor 114. Amplifier 201 (U1A) is of a type previously described with reference to power circuit 50, and forms part of Schmitt Trigger Circuit 200. The junction 214 to the negative input terminal of amplifier 201 is connected to ground 210 through the 0.02 microfarad ceramic-disc capacitor 209. The positive input terminal 213 to amplifier 201 (U1A) is connected through 213 to junction 204, which leads from the positive 12-volt power terminal 202 through the ¼ watt, 220 kohm resistor 203. Junction 213 is connected to ground 210 through the 100 k ohm, ¼ watt resistor 208. Amplifier 201 is paralleled by the ¼ watt, 10 megohm resistor 205 which is connected between the input junction 204 and the output junction 211 which leads through a pair of dual inputs to the NAND circuit 212 (U2A), which is part of the integrated circuit chip 28 previously described.

It will be recognized by those skilled in the art that circuit 201 (U1A) is arranged in a well-known circuit relation, known in the art as a Schmitt Trigger, the design and operation of which is described in detail in Transistor Circuit Design by the Engineering Staff of the Texas Instruments Corporation, McGraw-Hill, New York, 1963, pages 381–383. Further, 212 (U2A) is used as an inverter to preserve the polarity of the input signal.

The output terminal of the inverter 212 (U2A) is connected through the ¼ watt, 10 megohm resistor 305 to the junction 306 at the negative input terminal of the amplifier 301 (U1B) which is part of the integrated circuit chip 27 (U1) previously described.

The positive power terminal 302 is connected through the ¼ watt, 100 kohm resistor 307 to junction 303 to the positive input terminal of amplifier 301 (U1B). Junction 303 is connected to junction 308 and to ground 311 through a parallel circuit consisting of the ¼ watt, 100 kohm resistor 310 and the 0.02 microfarad capacitor 309. The output terminal 313 of the amplifier 301 is connected to the input through the 0.1 microfarad metallized MYLAR capacitor 312 in a negative feedback combination.

The output terminal 313 of amplifier 301 (U1B) in the one-second delay integrator circuit 300 is connected to the one-shot multivibrator circuit 400 through pin 2 of integrated circuit 401 (U3), which corresponds to circuit chip 29 previously described with reference to the power circuit 50. The positive 12-volt power terminal 402 is connected through the ¼ watt, 10 megohm resistor 412 to pin 7 at junction 413 of integrated circuit chip 401 (U3). A 2 microfarad 16 volt tantalum capacitor 414 is connected from pin 6 of 401 at junction 413 to ground 416; and a second 0.01 microfarad capacitor 415 is connected from pin 5 of 401 to ground 416.

The output of one-shot multivibrator circuit 400 passes out through pin 3 of integrated circuit chip 401 (U3) to junction 417, from which signals are simultaneously imposed on two separate circuit paths.

In accordance with one signal path, the relay coil 501, which is designed for 12 volts, and has 150 ohms resistance, is connected between junction 417 and ground 416, so that when output signals from pin 3 of the one-shot multivibrator 401 energize the relay 501 in circuit 500, it is caused to close its contacts 503. This connects the positive 12-volt source of power from terminal 502 to energize the 4-way solenoid valve 600.

In the embodiment under description, the 4-way solenoid valve 600 is of single solenoid construction, of a type well-known in the art, such as described, for example, in the ASCO "Red Hat" Bulletin No. 8342 of the Automatic Switch Company, Copyright 1979. This is a direct-acting four-way valve having a sliding resilient seal for tight seating. It requires no minimizing pressure. The valve operates when energized, and returns when de-energized. In the embodiment under description, this has been modified with a 12-volt D.C. coil, and consumes 32 watts. The structure of the water-powered dispensing meter 700, which is operated by solenoid valve 600, will be described hereinafter with reference to FIGS. 6 through 11.

Returning now to junction 417, a second signal path leads simultaneously into one of the input terminals of gate circuit 801 (U2B) of the 100 Hertz oscillator 800. This circuit comprises three NAND gates 801 (U2B), 803 (U2C) and 804 (U2D) which are part of integrated circuit chip 28 (U2) previously described with reference to the power circuit 50. The other input terminal 808 to NAND gate 801 is connected through the ¼ watt, 470 kohm resistor 805 to junction 816. The output terminal of NAND gate 801 (U2B) is connected through junction 810, 811, the dual input to NAND gate 803 (U2C). Junction 816 is connected to one input terminal of 803 (U2C) through the ¼ watt, 470 kohm resistor 806. Junction 816 is also connected to the output 812 of 803 through the 0.01 microfarad capacitor 807.

Junction 810, 811, the dual input to 803 (U2C) is also connected to the dual input to NAND gate 804, whose output terminal 813 is connected through the ¼ watt, 10 kohm resistor 903 to junction 904 to the base electrode of transistor 901 in circuit 900, which functions as an upward modulator for increasing the gain of oscillator 100, by, say, 10 percent. Transistor 901 is a small signal type, MPS6560, Motorola, manufactured by Motorola Semiconductor Products, Inc. Junction 904 is connected through the 0.02 microfarad capacitor 905 to the emitter of transistor 901 which is grounded at 906. As previously indicated, the output from the collector of 901 is returned through a ¼ watt, 100 ohm resistor 110 to the junction 113 of 200 kilohertz oscillator circuit 100, as previously explained.

Referring now to FIG. 5, circuit 60 shows the power connections for the portable animal circuit, which for convenience are shown separately from the signal circuit. This includes a 9-volt battery 65, preferably Mallory type MN1604, which is connected to energize a a pair of integrated circuit chips 62 and 66, connected in parallel across power terminals 63 and 64. Terminal 63 in the power circuit corresponds to positive power, 9-volt, terminals 1307 and 1402 is the signal circuit; and ground 64 corresponds to ground contacts 1107, 1207, 1312, 1316 and 1506 in the signal circuit.

Integrated circuit chip 66, designated U1', consists of the amplifiers 1601 (U1A') and 1604 (U1B') in tank detuning circuit 1600, amplifier 1203 (U1C') in decoder circuit 1200, and amplifier circuits 1301 (U1D'), 1303 (U1E') and 1305 (U1F') in delay circuit 1300.

In the present example, integrated circuit chip 66 (U1), which is connected across the power terminals by its pins 1 and 8, is of the general form disclosed in Section 7 of a Catalogue entitled "CMOS Integrated Circuits", Copyright Motorola, Inc., 1978, under the Catalogue #MC14049UB by Motorola Semiconductor Products, Inc., 3501 Ed Bluestein Boulevard, Austin, Tex. 78721. This is what is known in the art as a hex inverter/buffer constructed with MOS p-channel and n-channel mode-enhancement in a single monolithic structure. This circuit is characterized by low power dissipation and high noise immunity, and provides logic-level conversion using only one supply voltage.

Integrated circuit chip 62 (U2'), which is connected by its pins 14 and 7 across the power terminals 63 and 64, is represented in the signal circuit as memory circuit 1500 which is shown in combination with timer circuit 1400. In the present embodiment, integrated circuit chip 62 (U2') is of the general form disclosed in Section 7 of the "CMOS Integrated Circuits Catalogue" supra, Copyright 1978 by Motorola, Inc. published under the Catalogue #MC14541B. This is a programmable timer consisting of a 16-stage binary counter, and integrated oscillator for use with an external capacitor and two resistors (to be described hereinafter), an automatic power-on reset circuit, and output control logic.

Timing is initialized by turning on the power, whereupon the power-on reset is enabled, and initializes the counter within the specified range of the applied voltage. With the power already on, an external reset pulse can be applied. Upon release of the initial reset command, the oscillator will oscillate with a frequency determined by the external RC network (to be described in connection with the signal circuit). The 16-stage counter divides the oscillator frequency ($f_{osc}$) with the $n^{th}$ stage frequency, being $f_{osc}$ divided by two-to-the-$n^{th}$ power.

Referring to the signal circuit, the resonant tank circuit 1000 comprises a tuned circuit including the antenna coil 1001, which comprises 50 turns of 28 gauge enamel copper wire wound in a rectangular coil 6 by 8 inches, and carefully electrostatically shielded. This is connected in parallel between terminals 1003 and 1005 with capacitor 1002 which is set at a value to provide resonance to the frequency of oscillator 100. Junction 1003 is connected to junction 1609 in tank detune circuit 1600; and terminal 1005 is connected to junction 1004.

The latter leads into the input of the demodulator circuit 1100 through the 100 picofarad capacitor 1103, whose other terminal is connected to junction 1104 which is connected through the rectifying diode 1102 to junction 1105. The latter is connected to ground 1107 through a parallel circuit consisting of the ¼ watt, 10 megohm resistor 1106 and the 100 picofarad capacitor 1108. A return from ground 1107 to junction 1104 is provided by the rectifying diode 1101. Diodes 1101 and 1102 are of a type known in the art by code Number 1N914.

Junction 1105 is connected to the signal input terminal in decoder circuit 1200 of the inverter/buffer 1203 (U1C'), previously described, whose output terminal is connected through the 0.1 microfarad capacitor 1204 to junction 1205, which is connected to ground 1207 through the rectifying diode 1206. Junction 1209 is connected to 1205 through the rectifying diode 1208, and to ground 1207 through the 0.1 microfarad capacitor 1210. Diodes 1206 and 1208 are also of type 1N914.

Junction 1209 is also connected through the ¼ watt, 10 megohm resistor 1308 to the junction 1309, which is connected to ground 1312 through the 0.22 microfarad capacitor 1311.

Nine volts positive is provided from terminal 1307 to junction 1309 at the input of 2-second delay circuit 1300 through the ¼ watt, 10 megohm resistor 1310. The three inverter/buffer circuits 1301 (U1D), 1303 (U1E') and 1305 (U1F'), part of the integrated circuit U1 previously described, are connected with their signal circuits in series between junction 1309 and one terminal of the 0.002 microfarad capacitor 1313, whose other terminal is connected to junction 1314, which is connected to ground 1316 through the ¼ watt, 47kohm resistor 1315.

The junction 1314 at the output of the 2-second delay circuit 1300 is connected to input pin 6 to the timer-memory circuit 1400, 1500, (U2'), which is an integrated circuit chip which was previously described with reference to power circuit 60. The pins 12 and 13 of 1500 (U2') are connected together to positive power terminal 1402; and pins 5, 9 and 10 are connected together to ground 1506.

Pins 1, 2, and 3 are respectively connected through the ¼ watt, 100 kohm resistor 1406, the 0.01 microfarad capacitor 1407, and the ¼ watt, 100 kohm resistor 1408 to a common junction 1405. This combination is designed to establish the desired timing delay period for reset of memory circuit 1500. The particular values indicated were for a demonstration period of 4 minutes.

However, it will be understood by those skilled in the art that these values can be adjusted to give any desired period, such as, for example, the 24 hour period desired for repeated dosage of individual animals in the herd being serviced.

Output terminal pin 8 of memory circuit 1500 (U2′) is connected to the input terminal in tank detune circuit 1600 of the inverter/buffer 1601 (U1A′), whose output terminal is connected to the input terminal of inverter/buffer 1604 (U1B′) through junction 1603, both 1601 and 1604 being part of integrated circuit chip 66 (U1′) previously described.

The output of inverter/buffer 1604 is connected through the ¼ watt, 10kohm resistor 1606 to junction 1607. The latter is connected through the 0.01 microfarad capacitor 1608 to the junction 1609, which is directly connected to junction 1603. As previously described, one terminal of the tuned circuit consisting of coil 1001 and capacitor 1002 of resonant tank circuit 1000 is connected to 1609, the other terminal of the tuned circuit being connected to junction 1005 and 1004, which, in turn is connected to junction 1607 in circuit 1600 through the rectifying diode 1610. The latter is also a type known by code No. 1N914.

A particular advantage to the circuit of the present invention is that because of the compactness and small weight of the integrated circuit chips 62 and 66, which have dimensions of the order of 1 inch by ½ inch, by ¼ inch, and which together with coil 1001 and battery 65, weigh less than a few ounces, they can readily be incorporated into a collar strapped about the animal's neck. This apparatus can thus be worn by the animal without apparent discomfort and annoyance.

Let us refer to FIGS. 6–11 which describe the 4-way solenoid valve 600 and dispenser 700.

Device 700 is a metering pump, which is designed to dispense a specified volume of a "Liquid B", which may be a medicine or nutrient, each time control circuit 3 and the paddle valve 5 of the drinking fountain 4 is animal-activated. This device is connected to be actuated by the relay circuit 500 in the stationary control circuit 2, described hereinbefore. It will be also understood, that in addition to the controls shown and described, electronic and/or optical sensors of a type well-known in the art may also be located with reference to the intake manifold of "Liquid B" so that solenoid valve 600 can only be activated when the proper values are sensed.

FIGS. 6 through 11 show metering pump 700 schematically, in longitudinal section, and show the metering device 700, 4-way solenoid valve 600 and their associated valves, in different phases of their operation.

The metering pump 700 may be of general cylindrical form, for example, of brass, having an outer casing 701, a little over twice as long as its cross-sectional dimension. This is hollowed out internally to provide abutting cylindrical internal chambers, 702 of large cross-section at the right hand end, which extends a little less than half the axial length, and a smaller chamber 703, of about half the diameter, which extends along the axis to the left-hand end, terminating in a vent hole 712. The internal abutting wall 715 at the interface of the two chambers acts as a valve seat for piston 704. The latter has a head of a diameter which slidably conforms to the inner diameter of chamber 702, extending a little more than half the axial length of the same, and terminating at its inner left-hand end in a hollow stem 704a. The latter is slidably accommodated in the inner end of chamber 703, extending flush with, but not across, the opening of a bypass pipe 707 when the head 704 is seated against wall 715. The piston head 704 has an axially-disposed well 716 sunk in its outer end, which is about one-third the diameter of the piston head, and extends a little more than half its depth along the axis.

A second piston 705 having a head which is slidably accommodated in the chamber 703, has an axially-disposed stem 705a which is slidably accommodated in the hollow stem 704a, and is of such an axial length that when its head is disposed flush with the left-hand side (but not across) the opening of bypass pipe 707, the right-hand end of 705a is flush with the outer face of piston head 704, there being a slight annular clearance between piston stem 705a and the well 716. A steel "O" ring 742 surrounds the end of the stem 705a.

A spring-bias, comprising coil-spring 708 is disposed between the outer end of piston head 705 and the left-hand internal face of the chamber 703; and a spring-bias comprising coil-spring 709 is disposed between the inner end of piston stem 704a and the inner face of piston head 705.

An axially-disposed opening 603 in the right-hand end wall of casing 701 communicates between the 4-way solenoid valve 600 and the large pump chamber 702 to provide for water intake, or exhaust, depending on the setting of the valve 600.

A pipe 706 leads into chamber 703 just to the left of the center, along the length of casing 701, for the intake of medicine or nutrients from the supply reservoir 650. The bypass pipe 707 leads from about the center along the length of chamber 702 to about the center along the length of chamber 703, well to the left of the medicine intake pipe 706. The output pipe 9 for a dose of medicine or nutrient is aligned in the same diametric plane with the lead-in bypass pipe 707 to chamber 703.

Water outlets 710 and 711 are respectively disposed in chamber 702 near the inner wall 715, and opposite the terminal of bypass pipe 707. They meet in common junction at water outlet pipe 8, with pipe 601 from the 4-way valve 600.

FIG. 6 shows the normal, deactivated position of the metering valve 700 and 4-way solenoid valve 600. In the case described, "Liquid A" is water; and valve 5 is opened by a paddle 5a which is depressed when an animal attempts to drink from the fountain 4. (See FIGS. 1 and 2). When this is the case, the water will go through valve 5 and the 4-way solenoid valve 600 directly to the drinking fountain 4, through passage 601.

Referring to FIG. 7, when an animal in need of a dose of "Liquid B" (which is the medication or nutrient) is sensed by the stationary control circuit 2, the 4-way solenoid valve 600 will be energized; and when the animal opens valve 5, water pressure will be applied to the metering pump 700 through 603 moving the pistons 704 and 705 to the left and closing the "Liquid B" input port 706. The specified volume of "Liquid B" is now trapped in chamber 709 between piston 704 and piston 705. Water pressure is at least about 3 p.s.i.

Referring to FIG. 8, when piston 705 reaches the end of its travel to the left, the outlet port 9 for "Liquid B" is opened; and further motion of piston 704 to the left ejects "Liquid B" through port 9 and into drinking fountain 4.

Referring to FIG. 9, when both pistons 704 and 705 have reached the end of their travel to the right and left respectively, piston 704 opens two more ports, namely outlet port 711 directly to the drinking fountain, and the small bypass line 707, to flush out the remaining "Liquid B" trapped between the pistons, 704 and 705. The metering valve 700 will remain in this position as long as valve 5 is open and the 4-way solenoid valve 600 is energized.

Referring to FIG. 10, when the solenoid valve 600 is de-energized, the biasing springs 708 and 709 in the metering valve 700 will move the pistons 704 and 705 back toward their original positions. Springs 708 and 709 are so selected that the pistons 704 and 705 will move together to close the "Liquid B" outlet 9 and the ports of bypass line 707.

Referring to FIG. 11, when the pistons 704 and 705 reach the end of their travel to the right and left respectively, the inner face of piston head 705 and the inner end of piston stem 704a will open the "Liquid B" input port 706; and the spring 709 between the two pistons 704 and 705 will force them apart, drawing "Liquid B" into the annular space between them. The metering valve 700 will now be in the normal de-activated position shown in FIG. 6, and in position to dispense the specified volume of "Liquid B" when it is next required.

The lock ring 742 shown on the end of piston stem 705a limits the travel of piston 705 in relation to piston 704. It is contemplated that spacers can be placed under lock ring 742 to decrease the volume of "Liquid B" dispensed per stroke of metering pump 700.

OPERATION

Stationary Control Circuit 3—Normal Standby Condition

Normal standby condition of the stationary unit 3, with all portable circuits far removed, consists of the marginal oscillator 100 oscillating in a carrier wave (unmodulated) mode at a frequency of approximately 200 kilohertz. The output D.C. voltage of oscillator 100 to Schmitt Trigger 200, which indicates if oscillator 100 oscillating, is low, of the order of less than 2 volts. (A low output indicates oscillator 100 is oscillating, whereas a high output, of the order of more than 4 volts, indicates no oscillation).

In this condition, the output of Schmitt Trigger 200 to the one-second delay circuit 300 is low, approximately zero volts. The output of the latter is high, approximating the supply voltage, due to an internal voltage inversion. The output of one-shot multivibrator 400, which in the present embodiment provides a twenty-second voltage pulse to each of relay circuit 500, and the 100 hertz oscillator 800, is low, approximating zero volts.

Relay circuit 500 is de-energized; and therefore supplies no power to 4-way solenoid valve 600, the latter remaining closed, thereby preventing water-powered dispensing valve 700 from dispensing any medication or nutrient (Liquid B).

One hundred hertz oscillator 800 is disabled by the approximately zero input from the one-shot multivibrator 400, which causes its output to modulator 900 to remain at a constant low value, also approximating zero.

Modulator 900 is held in an "off" condition by constant low voltage input from oscillator 800; and therefore has no effect on marginal oscillator 100.

Portable Circuit Normal Standby Condition

Normal standby condition of the portable unit 2, when far removed from any stationary control circuits 3, is as follows:

Resonant tank circuit 1000 is tuned to a resonant frequency exactly equal to the frequency of oscillation of oscillator 100 in the stationary control circuit 3, which in the case under description is 200 kilohertz. Since the portable and stationary circuits are widely separated, there is no exciting signal present in resonant circuit 1000.

Demodulator circuit 1100 which is a voltage-doubler type AM demodulator, has zero output in the present condition, since its input from tank circuit 1000 is also zero.

The output of demodulator 1100 serves as input to the decoder circuit 1200, which comprises an amplifier and AC-coupled, voltage-doubler rectifier. Since no signal is present, there is no output from demodulator 1100 to the 2-second delay circuit 1300, which comprises inverters 1301, 1303, and 1305 in series.

The input to inverter 1301 in the 2-second delay circuit 1300 is normally held high by resistor 1310, approximating the supply voltage. If suitable signal and modulation were present at resonant tank circuit 1000, through decoder circuit 1200, then the output of the latter would go to a negative value sufficient to force the input of inverter 1301 to zero, subject to the time constant of resistor 1308 in parallel with resistor 1310 and capacitor 1311. Therefore, upon application of the negative output from decoder circuit 1200, after a delay of two seconds, circuit 1300 would generate a single positive output pulse. In this case, however, the output remains at zero, as there is no input to delay circuit 1300.

Timer-memory circuit 1400, 1500, in the present example comprises a single integrated circuit, consisting of an RC oscillator, a counter chain which operates to divide by $2^{16}$, and an output flip-flop circuit. Immediately, upon an input pulse from junction 1314 to pin 6 of timer-memory circuit 1400–1500, the counter states are initialized to the all-zero state, and the flip-flop (memory bit) is set, producing a low voltage output at pin 8. When sufficient time, as set by resistors 1406, and 1408 and capacitor 1407, has elapsed, with no input pulse to pin 6, the counter chain 1500 generates an overflow bit which resets the flip-flop circuit incorporated in memory circuit 1500; and the voltage output of pin 8 goes high, approximating the supply voltage, and remains high indefinitely in the absence of any input voltage to pin 6.

Tank detuner circuit 1600, when the input voltage is high from memory circuit 1500, has no effect on the resonant tank circuit 1000. If the memory circuit 1500 generates a low input voltage, approximating zero then detuner circuit 1600 operates to detune, and radically lowers the "Q" of tank circuit 1000. If sufficient time, (say 24 hours in the preferred example) has elapsed since the portable circuit 2 and stationary control circuit 3 were coupled to one another, the input voltage to tank detuner circuit 1600 will be high, approximating the supply voltage; and therefore, the latter will have no effect on resonant tank circuit 1000.

Effect of Bringing Portable Circuit 2 and Stationary Control Circuit 3 Into Close Proximity Case I: When the Time of Separation has been longer than the period of timer 1400:

Due to mutual coupling between coil 1001 in resonant tank circuit 1000 and coil 107 in marginal oscillator 100 of stationary control circuit 3, resonant tank circuit 1000 absorbs sufficient energy from marginal oscillator circuit 100 to greatly reduce the amplitude of oscillations, or even to stop oscillator 100 from oscillating; therefore, the voltage output from oscillator 100 to Schmitt Trigger 200 rises.

As the voltage output from oscillator 100 rises past the threshold voltage of Schmitt Trigger 200, which may be, for example, about 4 volts (positive), the output of the latter switches from a low voltage output, approximating zero to a high voltage output approximating the supply voltage. At the instant that the output of Schmitt Trigger 200 switches to high voltage, the one-second delay of circuit 300 begins. If the output of Schmitt Trigger 200 remains high, then one-second later, the output of delay circuit 300 will switch from its normal high voltage to a low voltage approximating zero.

The high-to-low voltage transition of the output of delay circuit 300 initiates operation of the 20-second one-shot multivibrator 400. At this time, the output of multivibrator 400 switches from a low voltage approximating zero, to a high voltage approximating the supply voltage at which it will remain for 20 seconds, regardless of the state of delay circuit 300.

During the 20 seconds interval that multivibrator 400 output voltage is high, two groups of events occur simultaneously.

The first groups is as follows:

Relay circuit 500 is energized, feeding power to solenoid valve 600, which is therefore caused to open, which operation, in turn, enables metering pump 700 to dispense a measured quantity of Liquid B (which may be medication) as an animal actuates the paddle valve 5 of water fountain 4.

The second group is as follows:

Oscillator 800 operating at a frequency of 100 hertz, is enabled, such that its output voltage instead of being at its normally low value approximating zero, now switches from low, to high, approximating the supply voltage and back again to low, vibrating at 100 hertz during the entire 20-second interval. During the positive half cycles of 100 hertz oscillations by oscillator 800, modulator 900 increases the gain of marginal 200 kilohertz oscillator 100 by effectively paralleling emitter resistor 111 with resistor 110. Consequently, the oscillator circuit 100, which still oscillates at a carrier wave frequency of 200k hertz, is amplitude-modulated at the 100 hertz rate, or possibly switched on and off, if coupling to the resonant tank circuit 1000 in the animal's portable circuit 2 is sufficient to initially stop the oscillation.

This 100 hertz amplitude-modulated carrier wave signal from oscillator 100 is also present at the tank circuit 1000 in the portable circuit 2, due to the previously-mentioned mutual-coupling between coil 107 in the stationary circuit 3, and coil 1001 in portable circuit 2. The amplitude-modulated carrier signal is demodulated by circuit 1100 in the portable circuit 2; and the resulting 100 hertz signal is then applied to the input of the decoder circuit 1200.

The latter amplifies, then rectifies the 100 hertz signal, to produce a direct-current output voltage of negative polarity. This negative voltage is applied to the input of the two-second delay circuit 1300, forcing it from its normally positive output voltage to zero output voltage. As previously explained, two seconds after application of the negative voltage input, delay circuit 1300 outputs a single positive voltage pulse, directed simultaneously to the timer-memory circuit 1400, 1500, both functions being implemented into the single integrated circuit chip 28 (U2), as described with reference to power circuit 60, hereinbefore. The timer-counter chain including memory circuit 1500 is reset to the all-zeros state, thereby beginning a new timing cycle. Simultaneously the memory circuit 1500 is reset through low-voltage pin 8, to indicate that the animal has received its dose of Liquid B, and is therefore not qualified for further dosage.

Tank detuner circuit 1600 when it receives the low voltage input, approximating zero, from memory circuit 1500, detunes and lowers the "Q" of resonant tank circuit 1000. In this condition of changed resonant frequency, and lowered "Q", the tank circuit 1000 no longer absorbs a significant amount of energy from marginal 200k hertz carrier-wave oscillator 100 in the stationary circuit 3, which therefore returns to its normal standby condition, as do all the remaining elements, 200 through 700 in stationary circuit, subject to expiration of the applicable time delays.

No further interaction between the portable unit 2 and any stationary unit 3 is possible until the time intervals set by the timer 1400 in the specific animal's circuit has been satisfied.

Case II: Where the Time of Separation Has Been Shorter Than The Period Of Timer 1400:

In this case, when the portable unit approaches the stationary unit, no interaction between the portable unit 2 and stationary unit 3 occurs, due to timer 1400 having not yet reset memory circuit 1500, which, in turn, holds tank detuner circuit 1600 in the state which detunes and lowers the "Q" of carrier wave oscillator 100 in stationary circuit 3, thus preventing any effect on the stationary unit 3.

Since there is no interaction between stationary unit 3 and portable unit 2, no dose of Liquid B is dispensed, although the animal may receive unlimited water from the fountain 4.

It is contemplated that a system of the type described is adaptable for other types of two-way communication employing radiant energy; and that the principles of the invention can be adapted to ultrasonic and light-energy systems, such as those employing laser beams, as well as to systems of the type described employing electromagnetic radiation.

It will be understood that the present invention has been described with reference to a specific example, and is not to be construed as limited to the specific circuits or mechanical structures which are disclosed merely by way of example; but is only to be construed as limited by the scope of the appended claims.

Although the foregoing description describes the invention as one primarily useful for the administration of drugs or nutrients in liquid form to animals, the principles of the invention, within the scope of the appended claims, can also be applied to the administration of drugs or nutrients in solid form to animals, or to the administration of drugs or nutrients in liquid or solid form to humans.

What is claimed is:

1. A monitoring system comprising one or more central control stations and a plurality of portable stations;
said central control station comprising in combination:
central station transceiving means for transmitting an interrogating signal for reception by a portable station immediately adjacent to said central control station, and for receiving and responding to energy absorbed by said portable station from said interrogating signal in accordance with a first preselected set code;
means responsive to said central station transceiving means, upon receipt of said first preselected coded signal, to energize relay means:
(a) for enabling a pre-set electromechanical interaction to take place between said portable station and said central control station, and
(b) for modulating said interrogating signal with a recoding signal, and directing said interrogating signal modulated with said recoding signal to said portable station;
said portable station comprising in combination:
portable transponding means tunable to receive the interrogating signal of said central control station, and to absorb energy from said interrogating signal thereby to impress on said central station transceiving means a response; and to receive and decode said interrogating signal modulated with said recoding signal;
means comprising a memory circuit in energy transfer relation with said portable transponding means for providing an output for varying the tuning of said portable transponding means to selectively absorb energy from said interrogating signal to impress on the response of said central station transceiving means a signal coded in accordance with at least one of a plurality of preselected codes, including said first, preselected set code; and
means connected to said portable transponding means and said memory circuit and responsive to a recoding signal from said central station for changing the setting of said memory circuit from said first preselected set code to another preselected set code.

2. A monitoring system in accordance with claim 1 wherein said means responsive to said recoding means in said portable station includes a timing circuit in circuit relation with said portable transponding means and said memory circuit, said timing circuit responsive to receipt of said recoding signal from said central control station to reset said memory circuit from said first preselected set code to a second preselected set code for a preselected time period, and to return said memory circuit to said first preselected set code at the end of said time period;
wherein said memory circuit is caused to vary said tunable means to impress said second preselected code on said interrogating signal received during said time period, and to reimpress said first preselected set code on said interrogating signal after said time period has terminated;
said means in said central station, responsive to said central transceiving means, being responsive to said first preselected set code, but non-responsive to said second preselected set code.

3. An electronic monitoring system in accordance with claim 2 wherein said central transceiving means for transmitting an interrogating signal comprises a carrier-wave oscillator constructed to oscillate at a selected carrier-wave frequency; and wherein
said portable transponding means comprises a circuit precisely tunable to said carrier-wave frequency and comprising inductive means for forming a mutual inductive coupling with said carrier-wave oscillator when said portable station is disposed immediately adjacent to said central station.

4. The combination in accordance with claim 3 wherein said means for modulating said interrogating signal with said recoding signal comprises a second oscillator characterized by an oscillation frequency substantially lower than said carrier-wave frequency, and a modulating circuit connected between said second oscillator and said carrier-wave oscillator for modulating said carrier-wave with said modulating frequency;
and wherein said means connected to said portable transponding means for resetting said memory circuit in accordance with said recoding signal comprises a decoding circuit responsive to the modulating frequency of said carrier-wave.

5. An electronic monitoring system in accordance with claim 1 for controlling the dispensing of medication or nutrients (Liquid B) to the animals of a herd;
wherein said central control station includes an animal-actuated valve for dispensing water (Liquid A) into an animal drinking fountain disposed in cooperative relation with said relay means, and dispensing means for measured doses of said Liquid B,
wherein each of the portable stations of said plurality is fastened to an individual animal of said herd;
wherein said preset electromechanical interaction is triggered by the simultaneous actuation by an animal of a water-dispensing valve of said water dispensing fountain, and the receipt by said central transceiving means of a signal impressed on said interrogating signal by the portable station on said animal, coded in accordance with said first preselected set code; and
wherein said electromechanical interaction enabled by said relay means comprises the dispensing by said dispensing means of a premeasured dose of Liquid B into said drinking fountain for ingestion by said animal.

6. An electronic monitoring system in accordance with claim 5 wherein said means responsive to said recoding means in said portable station includes a timing circuit responsive to receipt of said recoding signal from said central control station to reset said memory circuit from said first preselected set code to a second preselected set code for a preselected time period, and to return said memory circuit to said first preselected set code at the end of said time period;
wherein said memory circuit is caused to vary said tunable means to impress said second preselected set code on said interrogating signal received during said time period, and to reimpose said first preselected set code on said interrogating signal after said time period has terminated, said means responsive to said central transceiving means, being responsive to said first preselected set code, but non-responsive to said second preselected code, to energize said relay means to actuate said means for dispensing doses of Liquid B into said drinking fountain;
whereby an animal actuating said water dispensing fountain will simultaneously receive a dose of Liquid B before or after said preselected time period but not during said preselected time period.

7. The combination in accordance with claim 6 wherein each of said portable stations fastened to an individual animal of said herd, comprising said transponding means including said tunable circuit, said memory circuit, and said source of power, are combined in an integrated circuit combination, not weighing more than a few ounces, the combination being attached to a collar around the animal's neck;

the central control station transceiving means including a carrier-wave oscillator;

said tunable circuit in each of said portable circuits including a coil which is disposed to form an inductive coupling with said carrier-wave oscillator circuit when said animal approaches said drinking fountain.

8. The combination in accordance with claim 5 wherein said dispensing means for dispensing discreet doses of Liquid B comprises a 4-way solenoid valve operative in combination with a metering pump connected to a reservoir of Liquid B, which operates upon the simultaneous actuation by said animal of said water dispensing valve and receipt in said central transceiving means of a signal coded in accordance with said first preselected set code, to energize said relay means to dispense said premeasured dose of Liquid B into said drinking fountain.

9. The combination in accordance with claim 8 wherein said 4-way valve is responsive, in a first position:

to provide, in simultaneous relation, a first passage directly from a water source through said water dispensing valve into said fountain, and to provide a second passage connected in axial relation to said metering pump for exhausting water from said metering pump;

and in a second position:

to provide, in simultaneous relation, a passage directly from said water source through said water-dispensing valve into said metering pump, and a passage for exhausting air from the water outlet of said metering pump.

10. The combination with claim 9 wherein water is provided from said water source at a water pressure of at least about 3 pounds per square inch.

11. The combination in accordance with claim 9 wherein said metering pump is constructed and arranged to comprise in combination:

a hollow housing enclosing a larger diameter cylindrical sleeve at one end in axially-aligned relation with a smaller diameter cylindrical sleeve at the other end, providing a partial abutting wall between them;

one end of said hollow housing connected to said 4-way valve through a central opening leading into said larger diameter sleeve for receiving water under pressure from said source in a second position of said 4-way valve and to expel air and/or water from said housing during a first position of said 4-way valve, the other end of said hollow housing being vented to the atmosphere through a central opening leading from said smaller sleeve;

an intake conduit for Liquid B interposed through the wall of said housing into said smaller sleeve near the abutting wall;

an outlet conduit for Liquid B interposed through the wall of said housing into said smaller sleeve at a position substantially spaced-apart to the left in an axial direction from said intake conduit;

a first and a second water outlet branch interposed at positions spaced-apart in an axial direction along said larger sleeve, said first position substantially centered in said larger sleeve and said second position adjacent said abutting wall, said branches leading into said water fountain through a common outlet;

a bypass conduit connected between said larger and smaller sleeves, said bypass conduit having one leg substantially diametrically aligned with said first water outlet branch in said larger sleeve, and its other leg substantially diametrically aligned with the outlet conduit for Liquid B in said smaller sleeve;

a pair of pistons A and B each of T-shaped section combined in oppositely-directed telescoping relation in said housing, piston A having a larger head which fits in slidable engagement into said larger sleeve, and piston B having a smaller head which fits in slidable engagement into said smaller sleeve, piston A having at its outer end an axially-centered well, and an inwardly-directed hollow stem which fits slidably into said smaller sleeve and axially accommodates in slidable relation the inwardly-directed stem of piston B;

the stem of piston A being of such a length, that when its head is closed in flush relation against said partial abutting wall, the end of its hollow stem extends up to, but does not close either the output conduit for Liquid B, or one leg of said bypass conduit into said smaller sleeve;

the stem of piston B being of such length, when in telescopically constricted position with piston A, that it extends through the length of piston A, including its well, and terminates adjacent its outer face in an O-ring fitting which exceeds the diameter of said smaller sleeve and operates to stop the motion of piston B when moved in a left-hand direction;

a first spring-bias interposed between the outer face of the head of piston B and the left-hand end of said smaller sleeve;

and a second spring-bias interposed between the inner annular face of the head of piston B and the end of the stem of piston A, forming between then an annular dispensing cavity of controllable dimension in an axial direction, wherein:

when said 4-way valve is in its first position bypassing water around said metering pump directly into the water fountain:

piston A is in its initial rest position with its head against the end wall of said larger sleeve, and piston B is slidably retracted in a left-hand direction from the end of piston A against the tension of said second spring-bias, maximizing the size of said dispensing cavity, thereby causing a measured dose to be drawn into said dispensing cavity through the intake conduit of Liquid B;

when said 4-way valve is in its second position admitting water under pressure directly into the housing of said metering pump:

piston A is forced to the left, closing the intake conduit of Liquid B and simultaneously, (a) forcing water from said larger sleeve into the water fountain through said second water outlet, and (b) ultimately, forcing piston B to the left to open the outlet conduit for Liquid B, thereby expelling a measured dose from said annular dispensing cavity, after which piston B is forced further to the left to open the bypass conduit between the larger and smaller sleeves admitting water under pressure to flush out remaining portions of Liquid B from said dispensing cavity, piston A subsequently opening said first water outlet branch to exhaust additional water from the larger sleeve into the drinking fountain; and upon said 4-way solenoid valve again assuming its first position:

pistons A and B are moved substantially in unison to the right, impelled by the compressive force of said first spring-bias, thereby closing the output conduit for Liquid B, and the legs of said bypass conduit, opening said second water outlet from said larger sleeve into said fountain for expelling any air or water from said meter housing, and again opening the intake conduit for receiving Liquid B into said dispensing cavity.

12. The combination in accordance with claim 11 wherein the axial dimension of said annular dispensing cavity, and therefor the volume of said premeasured dose of Liquid B, is under control of the size and/or position of the O-ring interposed adjacent the end of the stem of piston B.

13. A metering pump constructed and arranged to dispense premeasured doses of a first Liquid B from a first source into a receptacle simultaneously with a quantity of Liquid A from another source, which comprises in combination:

a hollow housing enclosing a larger sleeve at one end and a smaller sleeve at the other end, separated internally by a partial abutting wall;

said hollow housing being connected through an axially-disposed intake conduit at its right-hand end to a valve for supplying Liquid A under pressure into said larger sleeve, and said hollow housing being connected through an axially-disposed exhaust opening to the atmosphere at its left-hand end;

an intake conduit for Liquid B interposed through the wall of said housing into said smaller sleeve near said abutting wall;

an outlet conduit for Liquid B interposed through the wall of said housing into said smaller sleeve at a position substantially spaced-apart to the left in an axial direction from said intake conduit;

a first and a second Liquid A outlet branch interposed at positions spaced-apart in an axial direction along said larger sleeve, said first position substantially centered in said larger sleeve, and said second position adjacent said abutting wall, said branches leading into a common outlet for Liquid A into said receptacle;

a bypass conduit connected between said larger and smaller sleeves, said bypass conduit having one leg substantially diametrically aligned with said first Liquid A outlet branch in said larger sleeve, and its other leg substantially diametrically aligned with the outlet conduit for Liquid B in said smaller sleeve;

a pair of pistons A and B, each of T-shaped section, combined in oppositely-directed telescoping relation in said housing, piston A having a larger head which fits in slidable engagement into said larger sleeve, and piston B having a smaller head which fits in slidable engagement into said smaller sleeve, piston A having at its outer end an axially-centered well, and an inwardly-directed hollow stem coaxial therewith, which fits in slidable relation into said smaller sleeve, and axially-accommodates in slidably relation the inwardly-directed stem of piston B;

the stem of piston A being of such a length that when its head is closed in flush relation against said partial abutting wall, the end of its hollow stem extends up to, but does not close either the output conduit for Liquid B, or one leg of said bypass conduit into said smaller sleeve;

the stem of piston B being of such a length when in telescopically constricted position with piston A that it extends through the length of piston A, including its well and terminates adjacent its outer face in an O-ring fitting which exceeds the diameter of said smaller sleeve and operates to stop the motion of piston B in a left-hand direction;

a first spring-bias interposed between the outer face of the head of piston B and the left-hand end of said smaller sleeve;

and a second spring-bias interposed between the inner annular face of the head of piston B and the end of the stem of piston A forming between them an annular dispensing cavity of controllable dimension in an axial direction, wherein:

when said valve for Liquid A is closed:

piston A is in its initial rest position against the end wall of the larger sleeve, and the head of piston B is slidably retracted from the end of piston A in a left-hand direction, against the tension of said second spring-bias, maximizing the size of said dispensing cavity, thereby causing a measured dose to be drawn into said dispensing cavity through the intake conduit of Liquid B;

when said valve for Liquid A is open, supplying Liquid A under pressure:

piston A is forced to the left, closing the intake conduit of Liquid B and simultaneously forcing Liquid A from said larger sleeve into said receptacle through said second outlet for Liquid A, and ultimately, forcing piston B to the left to open the outlet conduit for Liquid B for expelling a measured dose from said dispensing cavity, after which piston B is forced further to the left to open the bypass conduits between the larger and smaller sleeves admitting Liquid A under pressure to flush out remaining portions of Liquid B from said dispensing cavity, and piston A subsequently opens said first outlet branch for Liquid A to exhaust additional amounts of said Liquid A from the larger sleeve into said fountain; and when the valve for Liquid A is again closed:

pistons A and B are moved substantially in unison to the right, impelled by the compressive force of said first spring-bias, thereby closing the output conduit for Liquid B, and the legs of said bypass conduit, opening said second outlet branch for exhausting Liquid A from said larger sleeve into said receptacle, for expelling any air or Liquid A from said meter housing, and again opening the intake conduit for receiving Liquid B into said dispensing cavity.

14. The combination in accordance with claim 13 wherein the axial dimension of said annular dispensing cavity, and therefor the volume of said premeasured dose of Liquid B, is under control of the size and/or position of the O-ring interposed adjacent the end of the stem of piston B.

15. The method of utilizing one or more central control stations to monitor a plurality of portable stations which comprises the steps of:

at said central station:
generating and transmitting an interrogating signal for reception by a portable station immediately adjacent to said central station, and receiving and responding to energy absorbed by said portable station from said interrogating signal in accordance with a first preselected set code;

upon receipt of a response from said portable station impressed with said first preselected set code, to energize relay means:
(a) for enabling a preset electromechanical interaction to take place between said portable station and said central control station, and
(b) for modulating said interrogating signal with a recoding signal, and directing said interrogating signal modulated with said recoding signal to said portable station; and at said portable station:
tuning means in said portable station to receive the interrogating signal from said central station, and to absorb energy from said interrogating signal for impressing a response on said central station transceiving means;
decoding said interrogating signal when modulated with a recoding signal;
utilizing the output of a computerized memory circuit under control of said decoding means for varying the tuning of said portable transponding means to selectively absorb energy from said interrogating signal to impress on the response of said central station transceiving means a signal coded in accordance with one or more preselected set codes including said first preselected set code;
and receiving and demodulating the recoding signal transmitted by said interrogating signal for changing the setting of said memory circuit from one said preselected set code to another preselected set code.

16. The method in accordance with claim 15 which comprises utilizing the recoding signal received from said transmitting means to initiate operation of a timing circuit in control of the setting of said computerized memory circuit, to reset said memory circuit from said first preselected code setting to a second preselected code setting for a preselected time period, and to return said memory circuit to said first preselected code setting at the end of said time period.

17. The method in accordance with claim 16 of generating an interrogating signal oscillating at a selected unmodulated carrier-wave frequency from an oscillator in said central control station;
and forming a mutual inductive relationship between means in said portable station precisely tunable to said carrier-wave frequency and said central station oscillator when said portable station is disposed immediately adjacent to said central control station.

18. The method in accordance with claim 17 wherein said recoding signal comprises a modulation impressed on said carrier-wave frequency at a frequency substantially lower than said carrier-wave frequency;
and wherein said recoding signal comprising said modulating frequency is demodulated in said portable circuit and the output utilized for controlling the setting of said memory circuit.

19. The method in accordance with claim 15 for controlling the dispensing of medication or nutrients (Liquid B) to animals of a herd, wherein said herd is controlled from a central station having an animal-actuated valve for dispensing drinking water into a fountain;
which comprises fastening a portable station individually to each of the animals of said herd;
which includes a circuit tunable to said interrogating signal and which forms a mutual inductive relationship with the generator of said interrogating signal at said central station when said animal is adjacent thereto;
and tuning said portable animal circuits to selectively absorb energy from said interrogating signal in accordance with said preselected set code;
whereupon said electromechanical interaction enabled by said relay means comprises the dispensing in response to an animal actuating said water-dispensing valve, a premeasured dose of Liquid B into said fountain for ingestion by said animal.

20. The method in accordance with claim 19 which includes interposing a timing circuit and a computerized memory circuit into said portable station individually attached to each of the animals of said herd, which timing circuit is responsive to receipt of said recoding signal from said central station to reset said memory circuit from said first preselected set code to said second preselected set code for a preselected time period and to return the same to said first preselected set code at the termination of said time period;
wherein said memory circuit is caused to vary said tuning means in said portable circuit to impress said second preselected set code on said interrogating signal received during said time period and to reimpose said first preselected set code on said interrogating signal after said time period has terminated;
whereby said relay means in said central station is responsive to said first preselected set code, but is non-responsive to said second preselected set code;
whereby an animal actuating said water-dispensing fountain will simultaneously receive a dose of Liquid B before or after said preselected time period, but not during said preselected time period.

21. Apparatus for automatically administering a dose of drug or medicine to an animal or human patient in admixture with said patient's drinking water and for preventing said patient from receiving a subsequent dose of said drug or medicine until the expiration of a predetermined period of time following the administration of said first dose, comprising:
(a) a source of water from which the said patient may drink water at will in accordance with the patient's needs;
(b) a dispenser for introducing into the water a drug or medicine which will be drunk along with the water by the patient when the patient drinks said water;
(c) a first control circuit for operating said dispenser to dispense the drug or medicine therefrom into said drinking water;
(d) a second control circuit carried by said patient which when brought in proximity with said first control circuit will absorb energy from the first control circuit and thereby cause the first control circuit to operate the said dispenser and introduce into said water a predetermined dose of said drug or medicine;

(e) and means in said second control circuit for preventing said first control circuit from operating the dispenser again when the second control circuit is again brought into proximity with the first control circuit until the expiration of a predetermined period of time.

22. Apparatus according to claim 21 in which the first control circuit comprises a marginal oscillator from which, when the first and second circuits are brought into proximity, the second circuit absorbs sufficient energy to substantially reduce the amplitude of oscillations in said oscillator, or even to stop the oscillator from oscillating, and this change in the condition of the oscillator is utilized to operate the dispenser.

23. In an apparatus for introducing into an animal's drinking water a predetermined dose of a drug or medicine during each of a succession of consecutive time periods, so that the animal will drink said drug or medicine with its drinking water in only a pre-selected dosage per unit of time regardless of how often the animal drinks water, a stationary control circuit including a first oscillator for dispensing said drug or medicine into said drinking water in response to a change in the oscillations produced by said first oscillator, a portable circuit carried by each of the animals to be treated with said drug or medicine which circuit will be brought into proximity with said stationary control circuit when the animal positions itself so as to drink said drinking water, and a second oscillator in said stationary circuit for transmitting a signal from the stationary circuit to a portable circuit when the portable circuit is brought into proximity with the stationary circuit, and means in the portable circuit responsive to said signal for rendering said portable circuit ineffective to absorb substantial amounts of energy from said first oscillator for a selected period of time following the transmission of said signal from the stationary circuit to the portable circuit.

* * * * *